Patented Apr. 11, 1939

2,154,405

UNITED STATES PATENT OFFICE 2,154,405

STABLE ICE COLOR PRODUCING COMPOSITIONS

Hans Z. Lecher, Plainfield, and Robert P. Parker, Somerville, N. J., assignors to The Calco Chemical Company, Inc., Bound Brook, N. J., a corporation of Delaware No Drawing. Application September 1, 1938, Serial No. 227,962

9 Claims. (Cl. 8—45)

This invention relates to the art of dyeing and printing ice colors. It relates also to new dye-producing compositions and the processes for applying them on materials, particularly textile materials. It refers more particularly to compositions comprising an ice color coupling component and a reaction product of an ice color diazo component with a guanyl-urea.

The diazo compounds used in the present invention may be produced by reacting an ice color diazo component with guanyl-urea or a derivative thereof.

Such ice color diazo components may be generally reacted with guanyl-ureas forming stable, mostly yellow, condensation products. The reaction takes place in an aqueous alkaline medium and is advantageously carried out at low temperature and with an excess of the guanyl-urea compound.

Guanyl-urea itself may be used and gives water insoluble condensation products which probably have the formula:

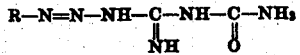

in which R is the radical of the ice color diazo component. Instead of guanyl-urea itself, guanyl-ureas substituted by hydrocarbon radicals, such as alkyl radicals, for example methyl, ethyl, propyl, butyl, etc.; aryl radicals, for example, phenyl, tolyl, naphthyl; aralkyl radicals, for example, benzyl; hydroaromatic radicals, for example, cyclohexyl; and the like may be used as starting materials, provided the guanyl-urea contains, attached to a nitrogen atom, at least one reactive hydrogen atom capable of reacting with the diazo component.

Furthermore, guanyl-urea-N-sulfonic acid and N-nitro-guanyl-urea may be used for the condensation with the diazo components, and also these starting materials may be substituted by hydrocarbon radicals provided the guanyl-urea portion contains, attached to a nitrogen atom, at least one reactive hydrogen atom capable of reacting with the diazo compound. Most probably the condensation products of the unsubstituted guanyl-urea-N-sulfonic acid and of the unsubstituted N-nitro-guanyl-urea have the respective formulae:

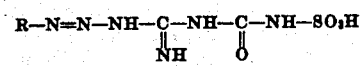

and

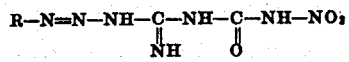

in which R is the radical of the ice color diazo component. The sulfonic acids and nitro compounds form soluble alkali salts and so do their condensation products with the ice color diazo components, which is a great advantage.

The stable diazo compounds can be produced from practically any ice color diazo component. Typical amines which can be diazotized or tetrazotized and reacted with guanyl-ureas are the following ones:

Aniline and its homologues, as e. g. the toluidines, 2,4-dimethylaniline; halogen derivatives of aniline and of its homologues, as e. g. the monofluoroanilines, the monochloroanilines, 2,5-difluoroaniline, 2-fluoro-5-chloroaniline, 2,5-dichloroaniline, m-aminobenzotrifluoride, p-aminobenzotrifluoride, 3-amino-4-chlorobenzotrifluoride, 2-methyl-3-chloroaniline, 2-methyl-4-chloroaniline, 2-methyl-5-chloroaniline, 3-methyl-4-chloroaniline, 5-methyl-2-chloroaniline, 2-methyl-4-chloro-5-bromoaniline, 2-methyl-4,5-dichloroaniline, 4-methyl-2,5-dichloroaniline; nitro derivatives of aniline and of its homologues and their halogen derivatives, as e. g. the nitroanilines, 2-methyl-4-nitroaniline, 2-methyl-5-nitroaniline, 4-methyl-2-nitroaniline, 2-nitro-4-fluoroaniline, 2-nitro-4-chloroaniline, 3-nitro-4-chloroaniline, 4-nitro-2-chloroaniline; ether derivatives of primary aromatic amines and their halogen derivatives, as e. g. o-anisidine, 2-methoxy-5-methylaniline, 2,5-dimethoxyaniline, 2-methoxy-1-naphthylamine, 2-amino-diphenylether, 2-amino-4-acetyl-diphenylether, benzyl-2-amino-phenyl-ether, 3-fluoro-4-methoxyaniline, 2-methoxy-5-chloroaniline, 2,5-dimethoxy-4-chloroaniline, 2-methoxy-4-chloro-5-methylaniline, 2-methoxy-5-bromoaniline, 3-bromo-6-ethoxyaniline, 4-chloro-2 - aminodiphenylether, 4 - amino - 2 - chlorodiphenylether, 4 - amino - 4'- chlorodiphenylether, 4,4'-dichloro-2-aminodiphenylether, 2,2',5'-trichloro-4-aminodiphenylether; ether derivatives of aniline and its homologues containing nitro groups, as e. g. 2-methoxy-4-nitroaniline, 2-methoxy-5-nitroaniline, 2-nitro-4-methoxy-aniline, 2-methoxy-4-nitro-5-methylaniline; monoacyl derivatives of aromatic diamines, as e. g. N-hexahydrobenzoyl-p-phenylene diamine, N-hexahydrobenzoyl-p-toluylene diamine, N-benzoyl-p-phenylene diamine; monoacyl derivatives of diaminophenol ethers, as e. g. 2-benzoylamino-4 - aminoanisole, 2 - hexahydrobenzoylamino-5-aminoanisole, 2-amino-5-benzoylamino-hydroquinone dimethylether and diethylether, 2-amino-5-hexahydrobenzoylamino-hydroquinone dimethylether and diethylether, 2-amino-5-butyryl-amino-hydroquinone dimethylether and diethylether, 2-amino-5-phenoxyacetylamino-hydroquinone diethylether, the monomethyl and the monobenzyl and the monophenylurethane of 2,5-diamino-hydroquinone dimethylether and diethylether, 1-amino-3-benzoylamino-4,6-dimethoxybenzene; analogous monoacyl derivatives of 2,5-diamino-4-alkoxytoluenes and of 2,5-diamino-4-alkoxychlorobenzenes and of 2,5-diamino-4-alkoxybenzene sulfodialkylamides; analogous monoacyl derivatives of 1,3-diamino-4,6-dimethylbenzene; the diethylamide of 2-amino-4(4′-chlorophenoxy)-benzoic acid; monoacyl derivatives of diamino-p-chlorophenylethers, as e. g. 2-amino-4-chloro-5-acetylaminodiphenylether, 2-benzoylamino-4-chloro-5-aminoanisole; amino derivatives of aromatic sulfones, as e. g. 3-amino-4-methyldiphenylsulfone, 2-amino-4′-methyldiphenyl sulfone, 2-amino-4-acetyldiphenyl sulfone, the ethyl ester of 3-amino-4-(p-toluene-sulfonyl)-benzoic acid, 4-methoxy-3-amino phenylethyl sulfone, (4-methoxy-3-aminophenyl)-benzyl sulfone, 4-ethoxy-3-amino diphenyl sulfone, 2-amino-4-(trifluoromethyl)-phenylethyl sulfone; amino derivatives of aromatic dialkylsulfonamides, as e. g. 3-amino-4-methylbenzene dimethylsulfonamide and diethylsulfonamide, 3-amino-4-methoxybenzene diethylsulfonamide; xenylamine; alpha and beta naphthylamine; alpha aminoanthraquinone; 2-amino-3-nitrofluorene and 2-amino-3-nitro-fluorenone; amino diarylamines and their ether derivatives and their nitro derivatives, as e. g. 2-methoxy-5-amino diphenylamine, 4-methoxy-4′-amino diphenylamine, 4-ethoxy-4′-amino diphenylamine, 3,4′-dinitro-4-amino diphenylamine; amino azo compounds, as e. g. 3,2′-dimethyl-4-aminoazobenzene, 2-methyl-4-amino-5-methoxy-4′-chloroazobenzene, 4-amino-4′-nitro-3-methoxy-6-methylazobenzene, 4-amino-4′-nitro-2,5-dimethoxyazobenzene, 4-amino-4′-chloro-3-methoxy-6-methylazobenzene, the azo dye: diazotized o-anisidine coupled onto alpha naphthylamine.

There are numerous aromatic diamines in which only one of the amino groups is diazotized and such amino diazo compounds may also be condensed with guanyl-ureas to form products of the present invention. An example of this type of amine is 2,6-dichloro-1,4-phenylenediamine.

Diamines in which both amino groups are diazotized to form tetrazo compounds will also condense with guanyl-ureas. Typical amines of this class are paraphenylene diamine, benzidine, orthotolidine, orthodianisidine, 4,4′-diaminostilbene, 4,4′-diaminodiphenylamine, 2,2′-dimethyl-4,4′-diaminodiphenylamine, 1,5-diaminonaphthalene.

Diazo and tetrazo compounds of heterocyclic amines can also be condensed with guanyl-ureas in accordance with the present invention. Typical heterocyclic amines are 2-aminocarbazole, 3,6-diaminocarbazole, 2-nitro-3-aminocarbazole, 2-nitro-3-aminodibenzofuran, 2-amino-3-nitrodibenzothiophene, 1-amino-5-fluorobenzothiazole.

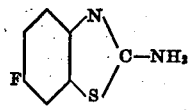

The reaction products of ice color diazo components with guanyl-ureas are very stable to heat and percussion and may be indefinitely stored. Besides, they are very stable to hydrolysis in alkaline medium and do not couple with ice color coupling components in such medium. However, they are split by acids at elevated temperature into the components from which their molecule has been built up. If this splitting occurs in the presence of an ice color coupling component the regenerated active diazo component couples immediately and produces the corresponding azo dye.

In the present invention the reaction products of ice color diazo components with guanyl-ureas are not claimed. Some of the compounds, however, are described and claimed in the copending application of Robert P. Parker, Serial No. 153,277 filed July 12, 1937, which application also describes methods of producing such compounds.

The reaction products of diazo components with guanyl-ureas may be mixed with one of the usual ice color coupling components such as naphthols, pyrazolones, hydroxy-benzofluorenones, benzoylnaphthols, and various N-substituted amides, particularly arylides of 2-hydroxy-3-naphthoic acid and its 5,6,7,8-tetrahydro derivative, of 2-hydroxy-3-anthroic acid, of methyl and dimethyl salicylic acids, of hydroxy-carbazole-carboxylic acids, of hydroxy-benzo-carbazole-carboxylic acids, of acetoacetic acid, of furoyl-acetic acid, of terephthaloyl-bis-acetic acid, of hydroxy-dibenzo-furan-carboxylic acids, of hydroxy-dibenzothiophene-carboxylic acids, etc. The reaction products of ice color diazo components with guanyl-urea-N-sulfonic acids or with N-nitro-guanyl-ureas are preferably used in the form of soluble salts, such as alkali metal salt, ammonium salts, etc.

The relative proportions of the two components present in this new composition of matter may vary; however, we prefer to use approximately equivalent quantities, the coupling component being in slight excess. The mixture may contain one or more reaction products of diazo components with guanyl-ureas and one or more ice color coupling components, since desirable shades are also obtained by using more than two components.

The mixture may contain also various assistants such as starches, gums, alkali, wetting and dispersing agents. As the reaction products of diazo components with guanyl-urea-N-sulfonic acids and N-nitro-guanyl-ureas are soluble in alkali and therefore applied in the dissolved state, the use of a dispersing agent is not necessary in this case. However, the reaction products of diazo components with guanyl-ureas themselves which do not contain a solubilizing group are only sparingly soluble in alkali and must be therefore thoroughly dispersed before incorporating them into a printing paste. This dispersion may be attained by treating the stabilized diazo compound together with the ice color coupling component first with a deflocculating agent as e. g. Tamol and then with a protective colloid as e. g. dextrine.

The textile material is printed or impregnated with the mixture and then treated with an acid, preferably with a weak acid at elevated temperature. By this acid treatment, the diazo guanyl urea compound is hydrolyzed and coupling to form the azo dye is effected. Acetic and formic acids give very favorable results but many other acids known to those skilled in the art may be used with an equally good effect. The acids may be applied either in the liquid or in the vapor state.

However, the ice color coupling component and the diazo compound need not be applied simultaneously, but the diazo compound may be applied after the coupling component with the same result.

When the ice color coupling component and stable diazo compound are printed as a mixture, it is possible to effect ageing in a somewhat different manner from that described above. The goods, if sufficiently acid resistant, such as animal fibres, may be impregnated with an acid substance such as e. g. sulfuric acid, sodium bisulfate and the like. The print is then made and the material steamed. The acid in the material effects splitting and develops the color. This method of impregnating the goods with an acid is not practical with materials which are not acid resistant, such as the various cellulosic fibres. In such a case, however, it is possible to use a material which liberates acid only when treated with steam. Such materials are, e. g. salts of strong acids with volatile weak bases such as ammonium sulfate, esters of acids which are hydrolyzed by steam such as esters of tartaric, succinic, malonic acids and the like and similar materials which set free acid in the presence of water at elevated temperatures. The acid yielding material may be mixed with the printing paste or the goods to be printed may be padded with the agent.

The processes of this invention produce excellent dyeings and printings on textile material as no side reactions take place in the formation of the azo dye. A further advantage is that the mixtures of the diazo compounds and the ice color coupling components are perfectly stable so that they may be stored without decomposition and explosion hazard. Furthermore, their alkaline printing pastes show a very high degree of stability and no premature formation of azo dyestuff takes place. The compounds used as starting materials in the preparation of stabilized diazo compounds are very cheap which is a further technical advantage of our invention.

The processes of the present invention may also be used for simultaneous or separate printing with a different class of dyes, namely, the sulfuric acid esters of leuco compounds of vat dyes. It is an advantage of the present invention that composite prints are thus possible and it is not necessary to restrict the printing of goods to dyes of a single class.

Some typical mixtures of the present invention and their use in dyeing and printing textile materials will be illustrated in the following specific examples, it being understood, of course, that the invention is not broadly limited to particular details herein set forth. The parts are by weight corresponding to parts by volume of water.

Example 1

The stabilized diazo compound produced by the reaction of diazotized 2-methyl-5-chloroaniline on guanyl-urea is obtained by the procedure described below:

17.8 parts of 2-methyl-5-chloroaniline hydrochloride (90.6%) are stirred in a solution of 39.3 parts of hydrochloric acid (23° B.) in 200 parts of water until well dispersed. The temperature is lowered to 3° to 5° C. by addition of ice. The arylamine is diazotized by addition of 6.9 parts of solid sodium nitrite while the mixture is stirred and the temperature is maintained below 7° C. by addition of ice. The diazo solution is filtered before use.

101 parts of guanyl-urea sulfate dihydrate are slurried with 400 parts of water and dissolved by addition of 40 parts of sodium hydroxide. The solution is iced to 0° C. and stirred, and the diazo solution as prepared above, is rapidly entered. The temperature is maintained below 7° C. during the reaction, conclusion of which is indicated by a negative diazo test on spotting with alkaline R-salt.

The precipitated product is filtered off and washed with water by reslurring it at 45° C. The cake is dried at 40° C. in vacuo. It shows a yellow color and has probably the structure:

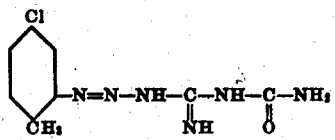

Example 2

A printing mixture is prepared from the product obtained according to Example 1 by colloidizing a mechanically prepared blend of 16.1 parts of the product and 13.8 parts of the ortho toluidide of 2,3-hydroxy-naphthoic acid The blend of 29.9 parts is deflocculated by grinding with 1.5 parts of Tamol (sodium salt of disulpho-dinaphthyl-methane) and a very little water. The smooth paste is thinned out by addition of 35 parts of water, then 1 part of trisodium phosphate is dissolved in the slurry. 23 parts of dextrine as protective colloid are worked into solution in the slurry. The colloidized mixture is dried at 40° C. in vacuo, ground and screened.

A printing paste is prepared from this colloidized product according to the following composition:

| | Parts |
|---|---|
| Colloidized mixture | 10.0 |
| Sodium xylene sulfonate | 0.5 |
| Water | 37.5 |
| NaOH (20%) | 6.0 |
| Cellosolve | 5.0 |
| Starch-gum tragacanth thickener | 41.0 |
| | 100.0 |

Cotton piece goods are printed from a copper roll, the prints are dried and developed by ageing in live steam containing acetic acid vapors. The developed prints are soaped at about 70° C., rinsed, and dried. The pattern is developed a red shade.

Example 3

The o-toluidide of 2,3-hydroxy naphthoic acid is blended with slightly less than the equivalent amount of the diazo compound (di-sodium salt) obtained by the reaction of diazotized 2-methyl-5-chloroaniline on guanyl-urea-N-sulfonic acid. A printing paste is prepared from this blend according to the following composition:

| | Parts |
|---|---|
| Blend | 5 |
| Cellosolve | 5 |
| NaOH (30° B.) | 2.5 |
| Water | 22.5 |
| Starch-gum tragacanth thickener | 65.0 |
| | 100.0 |

Cotton piece goods are printed from a copper roll with this print color paste. The prints are dried and developed by live steam containing acetic acid vapors. The developed print is soaped at about 70° C., rinsed, and dried. The pattern shows a red of excellent brightness, strength, and fastness properties.

When instead of the o-toluidide of 2,3-dihydroxy naphthoic acid its anilide is employed, also a red print is obtained. With its o-anisidide or o-phenetidide brilliant scarlets are produced. With the benzidide of acetoacetic acid a golden yellow shade is obtained. The fastnesses are very good.

Where the use of an ager is inconvenient, the print may be developed in a warm bath containing an aqueous solution of acetic acid, formic acid, and Glauber's salt. This bath is heated until the color is developed in full strength. The printed material may be also padded with the acid, dried at elevated temperature to develop the color, rinsed, soaped, washed, and dried again.

The mixture of the coupling component and the stabilized diazo compound may also be dissolved in alkali and cotton may be padded with this solution and the padded goods developed after drying as previously described.

*Example 4*

Cotton piece goods are padded with an alkaline solution of the ortho toluidide of 2-hydroxy-3-naphthoic acid in the usual manner and dried. The padded cloth is printed from a copper roll with the following paste:

| | Parts |
|---|---|
| The product obtained by the reaction of diazotized 2-methyl-5-chloroaniline on guanyl-urea-N-sulfonic acid (disodium salt) | 2.5 |
| Cellosolve | 5.0 |
| Sodium hydroxide (30° B.) | 2.5 |
| Water | 25.0 |
| Starch-gum tragacanth thickener | 65.0 |
| | 100.0 |

The printed goods are dried and developed with live steam containing acetic acid vapors. The developed print is rinsed, soaped at 70° C., rinsed again and dried. The print is a red shade of excellent strength and brightness.

*Example 5*

Cotton yarn is dyed from a bath by the following procedure. The cotton yarn is well boiled out, rinsed, and is padded with an alkaline solution of the ortho-toluidide of 2-hydroxy-3-naphthoic acid in the usual manner. The padded yarn is wrung out and dyed from a bath of the following composition:

| | Parts |
|---|---|
| The product obtained from reaction of diazotized 2-methyl-5-chloroaniline on guanyl-urea-N-sulfonic acid (disodium salt) | 1.0 |
| Acetic acid (glacial) | 1.0 |
| Formic acid (90%) | 0.5 |
| Glauber's salt | 2.5 |
| Water | 95.0 |
| | 100.0 |

The padded skeins are immersed at a bath temperature of 55° C. and while being well mixed the temperature of the dye bath is rapidly raised to 95° C. When the color is fully developed, the skeins are rinsed, soaped at 70° C., rinsed again and dried. The skeins are evenly dyed a red shade of excellent brightness and strength.

*Example 6*

2.8 parts of the anilide of 2,3-hydroxy-naphthoic acid are mechanically mixed with the equivalent amount of the diazo compound (disodium salt) obtained by the reaction of diazotized 2,5-dichloroaniline on guanyl-urea-N-sulfonic acid.

A print color paste is prepared from this blend according to the following composition:

| | Parts |
|---|---|
| Blend | 5.0 |
| Cellosolve | 5.0 |
| NaOH (30° B.) | 2.5 |
| Water | 22.5 |
| Starch-gum tragacanth thickener | 65.0 |
| | 100.0 |

Cotton piece goods are printed from a copper roll with this print color paste. The prints are dried and developed by ageing with live steam containing acetic acid vapors. The developed print is soaped at about 70° C., rinsed, and dried. The pattern shows a brilliant scarlet of very good fastness properties.

*Example 7*

3.4 parts of the 2,5-dimethoxy anilide of 2,3-hydroxy naphthoic acid are mechanically mixed with the equivalent amount of the diazo compound (sodium salt) obtained by the reaction of diazotized 2-nitro-4-methylaniline with guanyl-urea-N-sulfonic acid.

A print color paste is prepared from this blend according to the following composition:

| | Parts |
|---|---|
| Blend | 5 |
| Cellosolve | 5 |
| NaOH (30° B.) | 2.5 |
| Water | 22.5 |
| Starch-gum tragacanth thickener | 65.0 |
| | 100.0 |

Cotton piece goods are printed from a copper roll with this print color paste. The prints are dried and developed by ageing with live steam containing acetic acid vapors. The developed print is soaped at about 70° C., rinsed and dried. The pattern shows a Bordeaux of very good fastness properties.

*Example 8*

The o-toluidide of 2,3-hydroxy naphthoic acid is mechanically mixed with slightly less than the equivalent amount of the diazo compound (monosodium salt) obtained by the reaction of diazotized 3-chloroaniline with guanyl-urea-N-sulfonic acid.

A print color paste is prepared from this blend according to the following composition:

| | Parts |
|---|---|
| Blend | 5.0 |
| Cellosolve | 5.0 |
| NaOH (30° B.) | 2.5 |
| Water | 22.5 |
| Starch-gum tragacanth thickener | 65.0 |
| | 100.0 |

Cotton piece goods are printed from a copper roll with this print color paste. The prints are dried and developed by ageing with live steam containing acetic acid vapors. The developed print is soaped at about 70° C., rinsed, and dried. The pattern shows a strong orange of very good fastness properties.

Also orange shades are obtained when, instead of the o-toluidide, the anilide, the o-anisidide, or o-phenetidide of 2,3-hydroxy-naphthoic acid are employed.

Example 9

The o-phenetidide of 2,3-hydroxy naphthoic acid is mechanically mixed with slightly less than the equivalent amount of the diazo compound (dipotassium salt) obtained by the reaction of diazotized 2-methoxy-5-chloroaniline with guanyl-urea-N-sulfonic acid.

A print color paste is prepared from this blend according to the following composition:

| | Parts |
|---|---|
| Blend | 5 |
| Cellosolve | 5 |
| NaOH (30° B.) | 2.5 |
| Water | 22.5 |
| Starch-gum tragacanth thickener | 65.0 |
| | 100.0 |

Cotton piece goods are printed from a copper roll with this print color paste. The prints are dried and developed by live steam containing acetic acid vapors. The developed print was soaped at about 70° C., rinsed, and dried. It shows a brilliant red of very good strength and fastness properties.

When, instead of the o-phenetidide, the o-anisidide or the anilide of 2,3-hydroxynaphthoic acid are employed, also red shades are produced. The p-phenetidide of acetoacetic acid and the benzidide of acetoacetic acid give bright yellow colors. The p-chloroanilide of 2-hydroxycarbazole-3-carboxylic acid gives a valuable brown. Again the prints are strong, brilliant, and very fast.

Example 10

The anilide of 2,3-hydroxy naphthoic acid is mechanically mixed with slightly less than the equivalent amount of the diazo compound (tetrapotassium salt) obtained by the reaction of tetrazotized o-dianisidine with guanyl-urea-N-sulfonic acid.

A print color paste is prepared from this blend according to the following composition:

| | Parts |
|---|---|
| Blend | 5 |
| Cellosolve | 5 |
| NaOH (30° B.) | 2.5 |
| Water (approx. 40° C.) | 22.5 |
| Starch-gum tragacanth thickener | 65.0 |
| | 100.0 |

Cotton piece goods are printed from a copper roll with this print color paste. The prints are dried and developed by live steam containing acetic acid vapors. The developed print is soaped at about 70° C., rinsed, and dried. It shows a navy blue shade.

Example 11

The o-phenetidide of 2,3-hydroxy naphthoic acid is mechanically mixed with slightly less than the equivalent amount of the diazo compound (sodium salt) obtained by the reaction of diazotized 2-methyl-5-chloroaniline with N-nitro-guanyl-urea.

A print color paste is prepared from this blend according to the following composition:

| | Parts |
|---|---|
| Blend | 5 |
| Cellosolve | 5 |
| NaOH (30° B.) | 2.5 |
| Water | 22.5 |
| Starch-gum tragacanth thickener | 65.0 |
| | 100.0 |

Cotton piece goods are printed from a copper roll with this print color paste. The prints are dried and developed by live steam containing acetic acid vapors. The developed print is soaped at about 70° C., rinsed, and dried. A scarlet print is obtained of good fastness properties.

This application is in part a continuation of our copending application, Serial No. 153,276 filed July 12, 1937.

What we claim is:

1. A color producing composition of matter which comprises an ice color coupling component and a reaction product of an ice color diazo component with a compound included in the group consisting of guanyl urea, guanyl urea-N-sulfonic acid, guanyl urea-N-sulfonic acid alkali metal and ammonium salts, N-nitro guanyl urea, N-nitro guanyl urea alkali metal salts, and their derivatives substituted by alkyl, aralkyl, aryl of the benzene and naphthalene series, and cycloalkyl groups.

2. A color producing composition of matter which comprises an ice color coupling component and a salt of a reaction product of an ice color diazo component with guanyl-urea-N-sulfonic acid.

3. A color producing composition of matter comprising a reaction product of diazotized 2-methyl-5-chloroaniline with guanyl-urea-N-sulfonic acid in the form of an alkali metal salt and the benzidide of acetoacetic acid, said composition on treatment with weak acid at elevated temperature producing a golden yellow color.

4. A color producing composition of matter comprising a reaction product of diazotized 2-methyl-5-chloro-aniline with guanyl-urea-N-sulfonic acid in the form of an alkali metal salt and the ortho-phenetidide of 2-hydroxy-3-naphthoic acid, said composition on treatment with weak acid at elevated temperature producing a scarlet color.

5. A color producing composition of matter comprising a reaction product of diazotized 2-methyl-5-chloroaniline with guanyl-urea-N-sulfonic acid in the form of an alkali metal salt and the ortho toluidide of 2-hydroxy-3-naphthoic acid, said composition on treatment with weak acid at elevated temperature producing a red color.

6. An alkaline printing paste comprising a printing thickener associated with a mixture of an ice color coupling component and a reaction product of an ice color diazo component with a compound included in the group consisting of guanyl urea, guanyl urea-N-sulfonic acid, guanyl urea-N-sulfonic acid alkali metal and ammonium salts, N-nitro guanyl urea, N-nitro guanyl urea alkali metal salts, and their derivatives substituted by alkyl, aralkyl, aryl of the benzene and naphthalene series, and cycloalkyl, the paste being capable of developing color by treatment with weak acid at elevated temperature.

7. A process of coloring materials which comprises applying to the material a composition containing an ice color coupling component and a reaction product of an ice color diazo component with a compound included in the group consisting of guanyl urea, guanyl urea-N-sulfonic acid, guanyl urea-N-sulfonic acid alkali metal and ammonium salts, N-nitro guanyl urea, N-nitro guanyl urea alkali metal salts, and their derivatives substituted by alkyl, aralkyl, aryl of the benzene and naphthalene series, and cycloalkyl, the guanyl urea portion of the molecule being free from substituents capable of azoic coupling and subjecting the material to the action of weak acid at elevated temperature.

8. A method of printing which comprises printing the material with an alkaline printing paste containing a mixture comprising an ice color coupling component, and a reaction product of an ice color diazo component with a compound included in the group consisting of guanyl urea, guanyl urea-N-sulfonic acid, guanyl urea-N-sulfonic acid alkali metal and ammonium salts, N-nitro guanyl urea, N-nitro guanyl urea alkali metal salts, and their derivatives substituted by alkyl, aralkyl, aryl of the benzene and naphthalene series, and cycloalkyl, the guanyl urea portion of the molecule being free from substituents capable of azoic coupling and developing the color by subjecting the material to the action of a weak acid at elevated temperature.

9. A method of coloring material which comprises applying to the material an ice color coupling component, then applying a dispersion of a reaction product of an ice color diazo component with a compound included in the group consisting of guanyl urea, guanyl urea-N-sulfonic acid, guanyl urea-N-sulfonic acid alkali metal and ammonium salts, N-nitro guanyl urea, N-nitro guanyl urea alkali metal salts, and their derivatives substituted by alkyl, aralkyl, aryl of the benzene and naphthalene series, and cycloalkyl, the guanyl urea portion of the molecule being free from substituents capable of azoic coupling and then developing the color by subjecting the material to the action of a weak acid at elevated temperature.

HANS Z. LECHER.
ROBERT P. PARKER.